United States Patent
Caracas et al.

(10) Patent No.: US 10,244,392 B2
(45) Date of Patent: Mar. 26, 2019

(54) OVER-THE-AIR PERSONALIZATION OF NETWORK DEVICES

(71) Applicant: International Business Machines Corporation, Armonk, NY (US)

(72) Inventors: Alexandru Caracas, Thalwil (CH); Frank Hoering, Zürich (CH); Marcus B. Oestreicher, Zürich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 15/162,226

(22) Filed: May 23, 2016

(65) Prior Publication Data

US 2017/0339559 A1    Nov. 23, 2017

(51) Int. Cl.
| | |
|---|---|
| H04W 12/04 | (2009.01) |
| H04W 12/08 | (2009.01) |
| H04L 29/06 | (2006.01) |
| H04W 8/18 | (2009.01) |

(52) U.S. Cl.
CPC ........... *H04W 12/04* (2013.01); *H04L 63/061* (2013.01); *H04L 63/102* (2013.01); *H04W 8/18* (2013.01); *H04W 8/183* (2013.01); *H04W 12/08* (2013.01)

(58) Field of Classification Search
CPC ..... H04W 12/06; H04W 12/04; H04W 12/08; H04W 8/183; H04W 8/18; H04L 63/06; H04L 63/10; H04L 63/08; H04L 63/061; H04L 63/102
See application file for complete search history.

(56) References Cited

U.S. PATENT DOCUMENTS

| | | | |
|---|---|---|---|
| 9,191,818 B2 | 11/2015 | Larsson | |
| 9,231,904 B2 | 1/2016 | Johnson | |
| 2014/0279479 A1* | 9/2014 | Maniar | G06Q 20/36 705/41 |

(Continued)

FOREIGN PATENT DOCUMENTS

| | | |
|---|---|---|
| EP | 2950556 A1 | 12/2015 |
| WO | WO 2015/061678 A1 | 4/2015 |

OTHER PUBLICATIONS

Johan Stokking, The Things Network, "RFC: network architecture". Oct. 2015, downloaded from https://www.google.co.in/url?sa=t&rct=j&q=&esrc=s&source=web&cd=2&cad=rja&uact=8&ved=0ahUKEwjOkP33qKHKAhWQGY4KHWAgA-0QFgggMAE&url=http%3A%2F%2Fforum.thethingsnetwork.org%2Fuploads%2Fdefault%2Foriginal%2F1X%2F904b3879801d4be8b5a87e73cd450f6a5d439a0e.pdf&usg=AFQjCNFu3fH7OO0Fb2-.

(Continued)

*Primary Examiner* — Eleni A Shiferaw
*Assistant Examiner* — Cheng-Feng Huang
(74) *Attorney, Agent, or Firm* — Thomas A. Beck; Daniel P. Morris

(57) ABSTRACT

Embodiments of the present invention may provide the capability to personalize end devices over-the-air (OTA) without the involvement of device manufacturers, for example, in a federated large scale wireless IoT network, such as LoRaWAN. Preset with factory settings, end devices may securely connect to the network before they are finally personalized for their target service. Security sensitive personalization information may only be exchanged between device and service provider. The process may require relatively little effort by the network operator and end customers, may lower personalization costs, and may provide a (Continued)

security model that is attractive for a wide range of IoT applications.

6 Claims, 5 Drawing Sheets

(56) References Cited

U.S. PATENT DOCUMENTS

| | | |
|---|---|---|
| 2015/0026779 A1 | 1/2015 | Ilsar |
| 2015/0113172 A1* | 4/2015 | Johnson .................. H04L 67/34 709/245 |
| 2015/0304851 A1* | 10/2015 | Chen ..................... H04W 12/08 713/172 |
| 2017/0164417 A1* | 6/2017 | Kress .................... H04W 76/14 |

OTHER PUBLICATIONS

JeongGil Ko et al, "Sensor virtualization module: virtualizing iot devices on mobile smartphones for effective sensor data management". International Journal of Distributed Sensor Networks, vol. 2015 (2015), pp. 1-11.

* cited by examiner

OVER-THE-AIR PERSONALIZATION OF NETWORK DEVICES

BACKGROUND

The present invention relates to techniques for over-the-air personalization of network devices.

In large scale radio networks, such as Internet-of-Things (IoT) or mobile phone networks, end devices must be configured with security sensitive information (personalized) to be able to join a particular network by authenticating to the network provider. In mobile phone networks, this personalization is not performed by the end device manufacturer (phone manufacturer) or network operator, but is performed by a $3^{rd}$ party, the SIM card manufacturer. Once a customer receives a SIM card, the SIM card may be inserted in any GSM handset on the market and use the service of the network operator.

Large-scale IoT networks may also require the personalization of an end device with customer and network operator specific information, but IoT end devices may not include a SIM card due to cost. Additionally, end devices may not be fully managed and operated by the network operator, but may involve the collaboration of the network operator and the customer. For example, the service provider or application provider may be responsible for managing device keys and accepting devices in the network. This provides the capability for end-to-end encryption between end device and service provider or application provider without the network operator being able to eavesdrop on end device messages.

Accordingly, a need arises for techniques by which end devices may be personalized over-the-air (OTA) without the involvement of device manufacturers.

SUMMARY

Embodiments of the present invention may provide the capability to personalize end devices over-the-air (OTA) without the involvement of device manufacturers, for example, in a federated large scale wireless IoT network, such as LoRaWAN. Preset with factory settings, end devices may securely connect to the network in order to be finally personalized for their target service. Security sensitive personalization information may only be exchanged between device and service provider. The process may require relatively little effort by the network operator and end customers, may lower personalization costs, and may provide a security model that is attractive for a wide range of IoT applications.

In an embodiment of the present invention, a computer-implemented method for over-the-air personalization of a device may comprise associating the device with a wireless network using a first set of network credentials that provide secure communications with a service provider, receiving a second set of network credentials from the service provider over the wireless network, and storing the received second set of network credentials in the device, wherein the second set of network credentials provide personalized access to the wireless network.

The method may further comprise associating the device with a wireless network using the second set of network credentials. The first set of network credentials may be stored in the device when the device is manufactured. The first set of network credentials may comprise at least a first identifier of the device, a first encryption key, and an identifier of a first service provider, and the second set of network credentials may be received from a service provider over the wireless network and the second set of network credentials may comprise at least a second encryption key and an identifier of the service provider from which the second set of network credentials is received.

In an embodiment of the present invention, a device for communicating over a wireless network may comprise circuitry operable to store a first set of network credentials that provide secure communications with a service provider and to associate the device with the wireless network using the first set of network credentials, circuitry operable to receive a second set of network credentials from the service provider over the wireless network, and circuitry operable to store the received second set of network credentials, wherein the second set of network credentials provide personalized access to the wireless network.

In an embodiment of the present invention, a computer program product for over-the-air personalization of a device may comprise a non-transitory computer readable storage having program instructions embodied therewith, the program instructions executable by a computer, to cause the computer to perform a method comprising associating the device with a wireless network using a first set of network credentials that provide secure communications with a service provider, receiving a second set of network credentials from the service provider over the wireless network, and storing the received second set of network credentials in the device, wherein the second set of network credentials provide personalized access to the wireless network.

In an embodiment of the present invention, a computer-implemented method for over-the-air personalization of a device may comprise receiving a message or information based on, or including at least a portion of, a first set of network credentials that is stored in the device, the first set of network credentials providing secure communications with a service provider, generating and transmitting a response to receiving the message or information, receiving an indication that the device has been activated on a wireless network, establishing secure communication over the wireless network with the device, and generating and transmitting to the device, for storage in the device, a second set of network credentials using the secure communication over the wireless network, wherein the second set of network credentials provide personalized access to the wireless network.

The method may further comprise, in response to an initiation of service for the device, determining an eligibility of the device for service. The second set of network credentials may be usable by the device to associate with a wireless network. The first set of network credentials may be stored in the device when the device is manufactured. The first set of network credentials may comprise at least a first identifier of the device, a first encryption key, and an identifier of a first service provider, and the second set of network credentials may comprise at least a second encryption key and an identifier of a service provider from which the second set of network credentials is received.

In an embodiment of the present invention, a system for over-the-air personalization of a device may comprise a processor, memory accessible by the processor, and computer program instructions stored in the memory and executable by the processor to perform receiving a message or information based on, or including at least a portion of, a first set of network credentials that is stored in the device, the first set of network credentials providing secure communications with a service provider, generating and transmitting a response to receiving the message or information, receiving an indication that the device has been activated on a wireless network, establishing secure communication over the wireless network with the device, and generating and transmitting to the device, for storage in the device, a second set of network credentials using the secure communication over the wireless network, wherein the second set of network credentials provide personalized access to the wireless network.

In an embodiment of the present invention, a computer program product for over-the-air personalization of a device may comprise a non-transitory computer readable storage having program instructions embodied therewith, the program instructions executable by a computer, to cause the computer to perform a method comprising receiving a message or information based on, or including at least a portion of, a first set of network credentials that is stored in the device, the first set of network credentials providing secure communications with a service provider, generating and transmitting a response to receiving the message or information, receiving an indication that the device has been activated on a wireless network, establishing secure communication over the wireless network with the device, and generating and transmitting to the device, for storage in the device, a second set of network credentials using the secure communication over the wireless network, wherein the second set of network credentials provide personalized access to the wireless network.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide the capability to personalize end devices over-the-air (OTA) without the involvement of device manufacturers in a federated large scale wireless Internet of Things (IoT) network. Preset with factory settings, end devices may securely join the network before they are finally personalized for their target service. Security sensitive personalization information may only be exchanged between device and service provider. The process may require relatively little effort by the network operator and end customers, may lower personalization costs, and may provide a security model that is attractive for a wide range of IoT applications.

Figure 1:
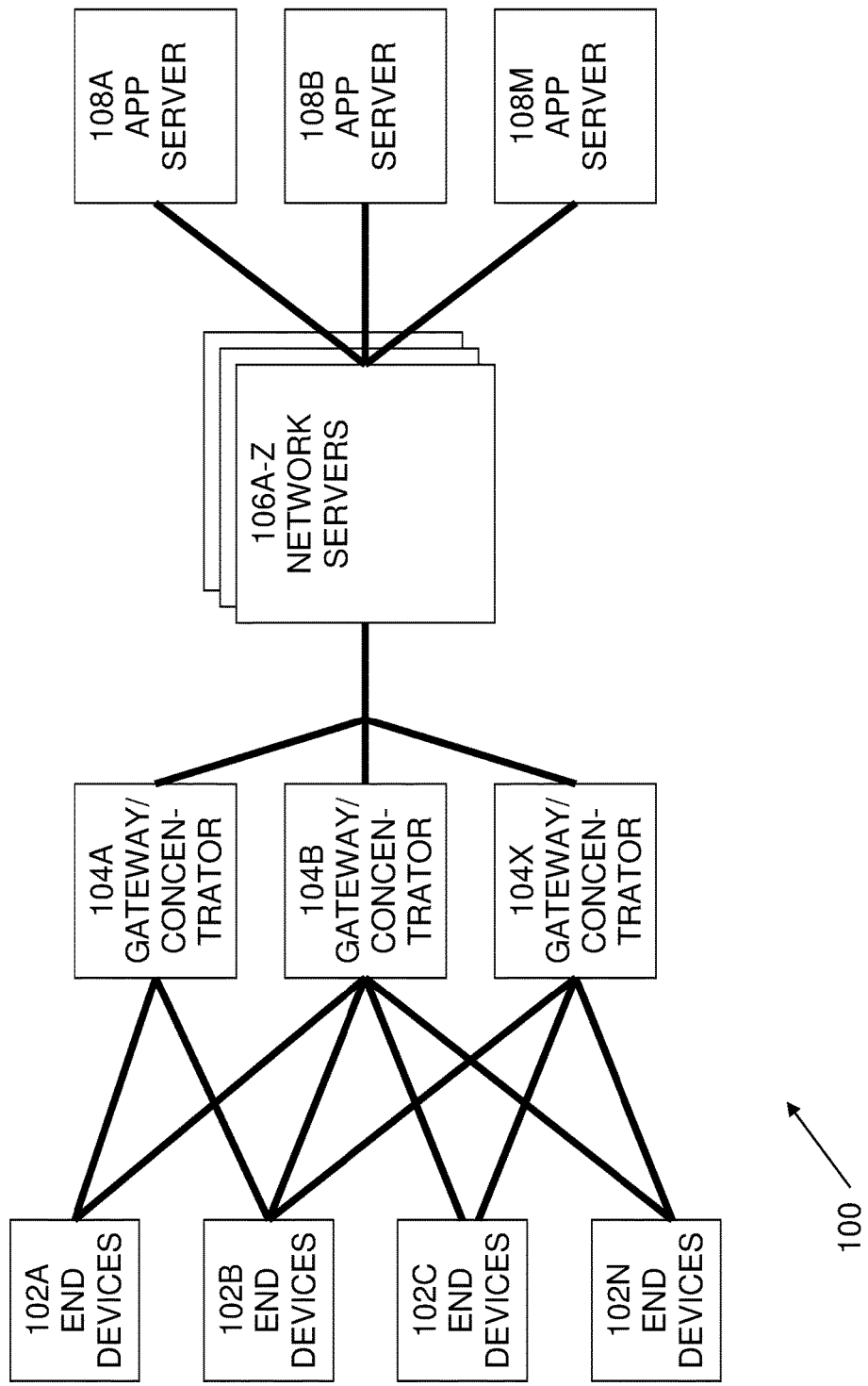
FIG. 1 is an exemplary diagram of a wireless network in which techniques of the present invention may be implemented.

An example of a wireless network 100 in which techniques of the present invention may be implemented is shown in FIG. 1. As shown in FIG. 1, a network architecture compatible with the Long Range Wide Area Network protocol (LoRaWAN) is shown as an example. Although a LoRaWAN network is shown as an example, the present invention contemplates implementation in any wireless data network.

LoRaWAN is a low power wireless networking protocol designed for low-cost secure two-way communication in the Internet of Things (IoT). The IoT is the network of physical objects—devices, vehicles, buildings and other items embedded with electronics, software, sensors, and network connectivity—that enables these objects to collect and exchange data. The IoT allows objects to be sensed and controlled remotely across existing network infrastructure.

The exemplary network 100 shown in FIG. 1 may include a number of components, such as end devices 102A-N, gateway/concentrators 104A-X, network servers 106A-Z, and app servers 108A-M. End devices 102A-N may include communication endpoint circuitry that may be connected or attached to essentially any device or object that may be controlled, monitored, or both. Gateway/concentrators 104A-X may include network nodes that are capable of interfacing with end devices 102A-N and with other network nodes, such as network servers 106A-Z. Gateway/concentrators 104A-X may include data concentrator functionality so as to connect a number of data channels, such as end devices 102A-N, with one destination, or a limited number of destination, such as one or more of network servers 106A-Z. Gateway/concentrators 104A-X typically communicate with end devices 102A-N wirelessly, but wired connections may also be contemplated. Network servers 106A-Z may include computer programs or devices that receive and respond to communications so as to provide functionality for other programs or devices. App servers 108A-M may include computer programs or devices that receive and respond to communications and run or access applications, so as to provide functionality for other programs or devices.

For example, as shown in FIG. 1, network servers 106A-Z may receive communications from end devices 102A-N via gateway/concentrators 104A-X, and may respond to those communications and/or forward the communications to app servers 108A-M. App servers 108A-M may receive communications from end devices 102A-N via gateway/concentrators 104A-X and network servers 106A-Z and may respond to those communications by providing application functionality. Likewise, communications may be initiated by app servers 108A-M and/or network servers 106A-Z and transmitted to end devices 102A-N via gateway/concentrators 104A-X, and end devices 102A-N may respond.

Figure 2:
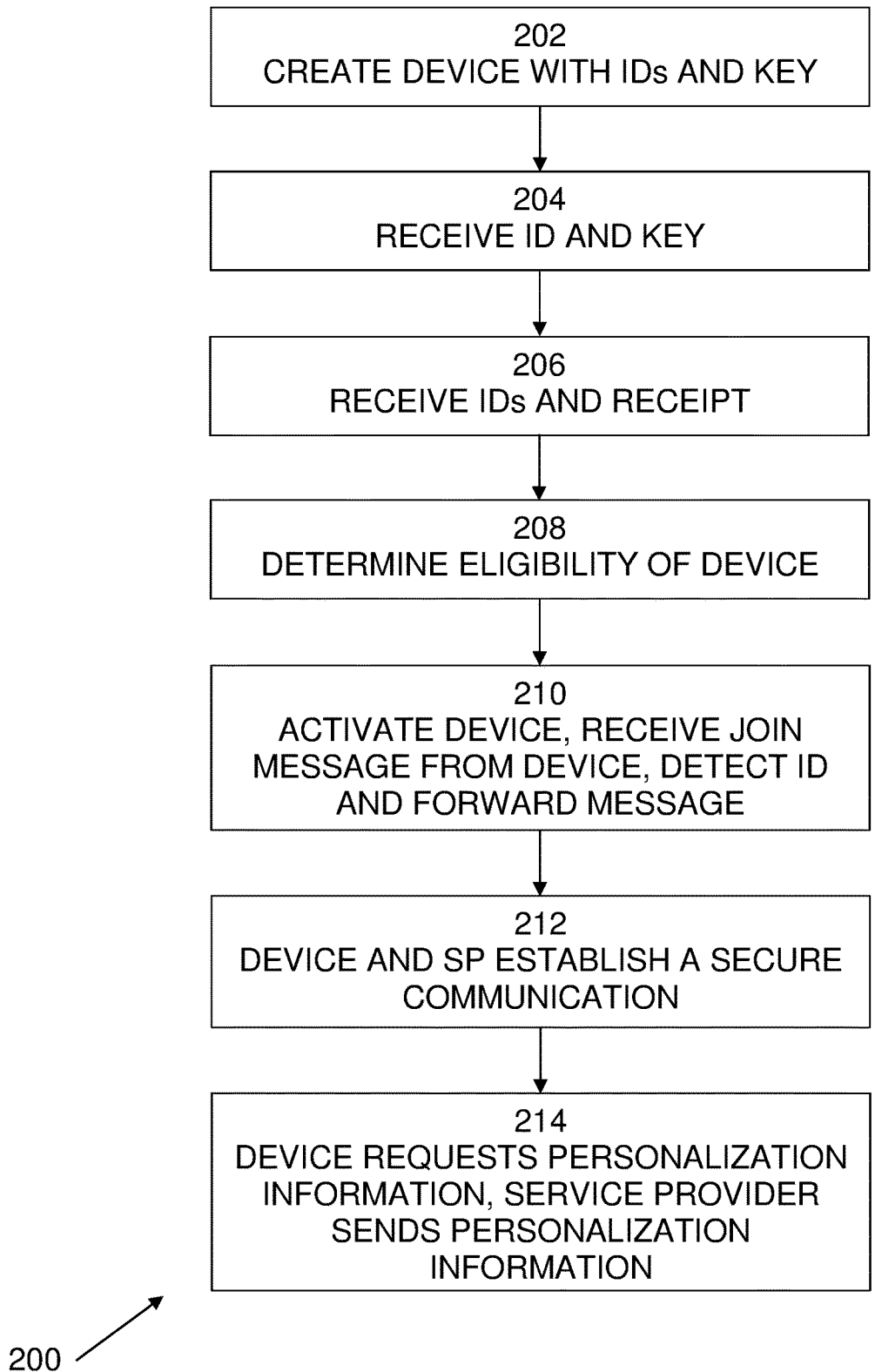
FIG. 2 is an exemplary flow diagram of a process for personalization of an end device.

Before end devices can communicate over a network, the end devices must be personalized and configured with the necessary identification and security information. An example of a process 200 for personalization of an end device is shown in FIG. 2. At 202, a device manufacturer creates/manufactures a device having an initial set of network credentials, which may include a globally unique and valid device ID (DEVID), a random service provider ID (rSPID) and a random device key (DEVKEY). The DEVID may, for example, be a MAC address, such as an address conforming to MAC-48, EUI-48, or EUI-64. For the example of LoRaWAN, a globally unique EUI-64 address may be used for the device. The EUI-64 address may be registered and it may be defined fully independently of any network operator or service provider.

At 204, after a customer obtains a device, the customer (or customer-controlled device) may initiate service for the device. For example, this may be done by the customer logging into a service provider website and signing a contract for service. The customer may provide the credentials, or a portion of the credentials, such as the DEVID and DEVKEY, which may be received by the service provider server(s). In response, the service provider server may process the received DEVID and DEVKEY and transmit a receipt from the service provider server to the customer.

At 206, the customer may initiate service with a network operator. For example, the customer may initiate service in person, at, for example, a network operator service desk, or the customer may login to a network operator website. The customer may provide the DEVID, the rSPID, and the receipt from the service provider, which may be received by the network operator server(s).

At 208, the network operator server may communicate with the service provider server to determine the eligibility of the customer and of the end device for service. For example, information that may be verified may include whether the DEVID is available or is already taken in the system and whether the service provider receipt is valid.

At 210, the end device is activated. For example, at the network operator service desk, the end device power may be switched on, or the customer may do so at their own location. The end device may transmit one or more wireless messages or information to connect to the wireless network of the network operator according to the protocol of that network. For example, the LoRaWAN standard specifies a protocol and the requisite messages to join the network. Typically, such messages or information are encrypted and may be based on, or include at least a portion of, the initial set of network credentials. The network operator server may receive the join message and may detect the registered DEVID (registered in 206). Based on this, the network operator server may reroute the message to the service provider indicated by the service provider receipt independently from the rSPID as found in the message. For security reasons, the network operator server may only forward the join request when it appears in a timely manner and when the message is received by a radio terminal in close vicinity to the network operator service desk or other authorized location.

At 212, the end device and service provider server may establish a secure communication using standard network protocols and the existing DEVID and DEVKEY. The device key is not known to the network operator. Accordingly, the network operator cannot eavesdrop on messages between the end device and service provider.

At 214, the end device may request new personalization information or credentials from the service provider. The service provider server may respond with new credentials, which may include a new DEVKEY and that service provider's ID. The end device may store this information into persistent memory. The end device is now fully personalized. The end device may then be reset, whereupon the end device may join the network using the new credentials with the service provider by the standard process for the network protocol, such as LoRaWAN.

The described techniques provide reasonable security. In the case of a trusted user, hijacking the communication between device and service provider after personalization is difficult. An intruder would have to have access to both the personalization information on the device as well as the communication between device and service provider, which takes place in a trusted environment. The network operator also does not have access to the factory DEVKEY or the personalized key.

As a customer can bring or make their own device, it is possible for someone to impersonate a different device. However, without the use of tamper resistant hardware in IoT networks, impersonating a device may be possible. The service provider must handle device data with care and may need to rely on plausibility analysis to detect faulty end devices. However, operation of other well behaved end devices is by such counterfeit devices.

In an embodiment, the user may register a device at the service desk of the network operator. This allows the network operator to inspect the device and perform the over-the-air personalization in a trusted environment.

In an embodiment, over-the-air device personalization may be performed at a customer determined location. When a customer records the device details on the website of the service provider, the service provider may communicate with the network operator and request delegation of the end device join request to the service provider server. After the device is switched on and sends a join request to the network operator server, the network operator server may allow the end device to join with the service provider. The end device and service provider may then finish the personalization as described above.

In an embodiment, the service provider may transmit the location, such as the GPS location, of a customer to the network operator. The network operator may only accept the join request of the end device if it is not yet known and the message was picked up in a timely manner by a base station close to the provided location. Additionally, the service provider may check whether the globally unique DEVID is registered with a known device manufacturer.

In an embodiment, the random service provider ID stored in a device may be replaced by a second globally unique ID. This may decrease the information to be shipped with a device.

Figure 3:
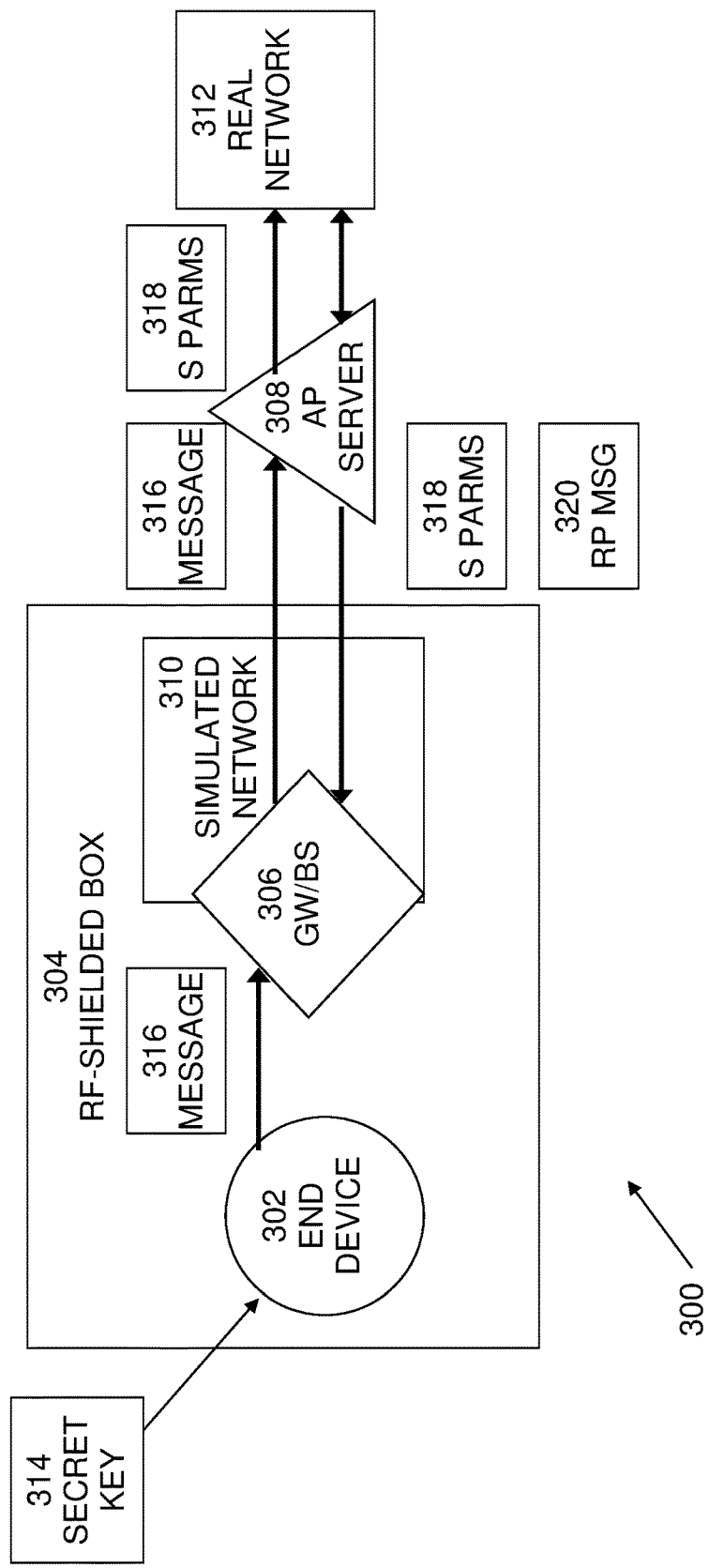
FIG. 3 is an exemplary block flow diagram of an exemplary system in which end devices may be securely personalized or re-personalized.

An exemplary system 300 in which end devices may be securely personalized or re-personalized is shown in FIG. 3. In the example shown in FIG. 3, end device 302 may be placed in an RF-shielded box 304 containing a gateway or base station (GW/BS) 306. GW/BS 306 may have a secure Internet connection to an application provider server 308. Further, GW/BS 306 inside RF-shielded box 304 may run a reduced version of a network operator operating system, and thus, may provide a simulated network 310, which is a simulation of the real network 312. Simulated network 310 may be viewed as a replica of real network 312.

Figure 4:
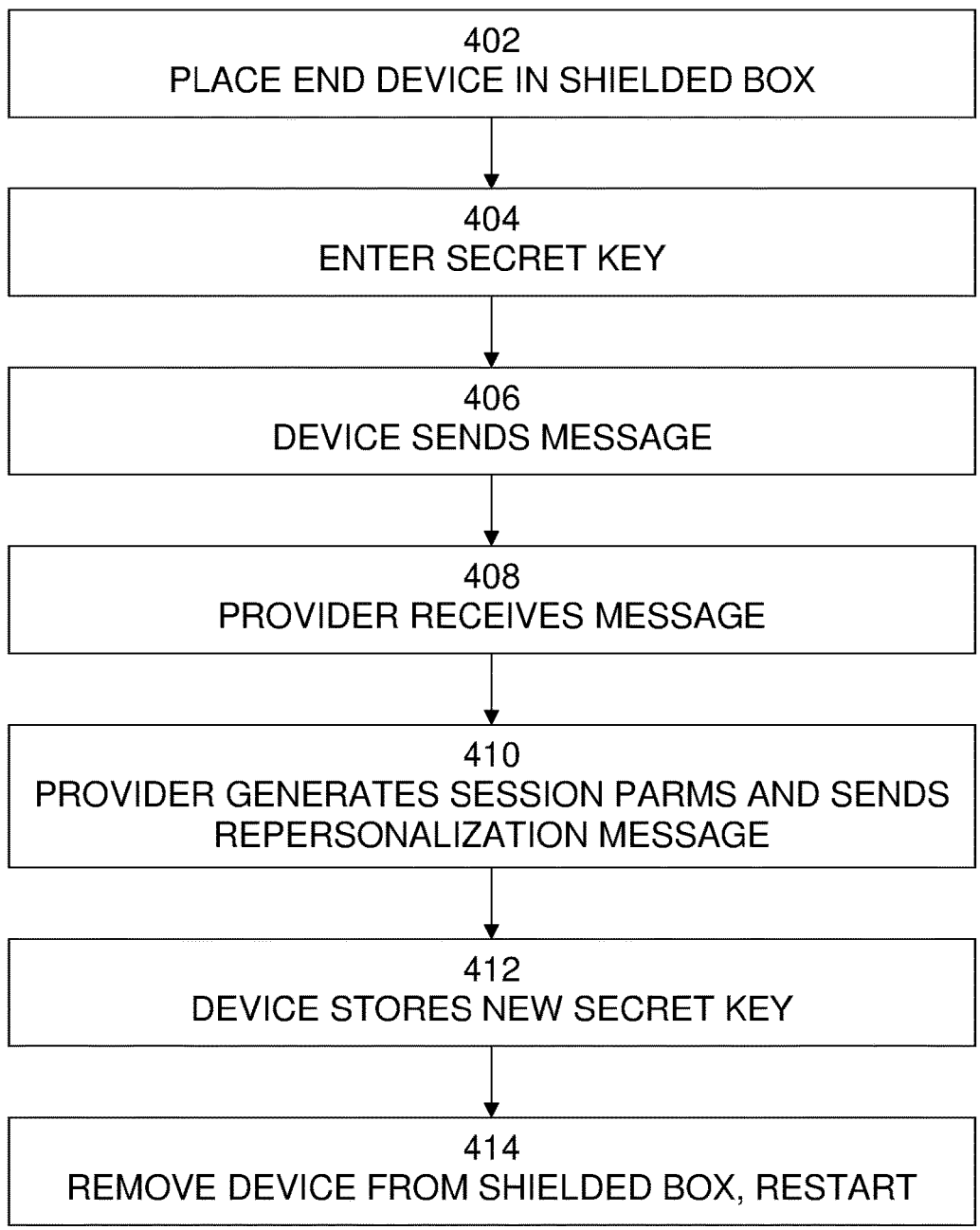
FIG. 4 is exemplary flow diagram of a process for personalization or re-personalization of an end device.

An example of a process 400 for personalization or re-personalization using system 300, shown in FIG. 3, is shown in FIG. 4. It is best viewed in conjunction with FIG. 3. Process 400 begins with 402, in which the end device 302 to be personalized or re-personalization in placed into RF-shielded box 304. In 404, the secret key 314 may be entered into end device 302 using an interface that may be provided by the application provider. Typically, this may be a manual step, but automated entry is also contemplated.

In 406, end device 302 may be activated. In response, end device 302 may send a message 316, which may include the factory settings for end device 302, and which may request to participate in the network. Message 316 may include DEVID and DEVKEY and other factory settings, and may be protected by secret key 314.

As end device 302 is inside RF-shielded box 304, in 408, message 316 may only be received by GW/BS 306 inside RF-shielded box 304. Hence, there is no risk of leaking information to an eavesdropper using a radio sniffer. GW/BS 306 sends message 316 to application provider server 308, which may receive message 316, and, knowing secret key 314, may extract DEVID and DEVKEY and other factory settings.

In 410, application provider server 308 may generate session parameters 318 and may communicate them to both simulated network 310 and real network 312. Application provider server 308 may also send to end device 302 a re-personalization message 320, which may contain a new secret key and the correct ID of the application provider. In 412, end device 302 may write to its persistent memory the new secret key and the new application provider ID.

At 414, end device 302 may be removed from the RF-shielded box 304. End device 302 may continue normal operation using session parameters 318. On the next start or restart, end device 302 may send a request to join real network 312 using the newly personalized values using the new secret key as protection. This request will be forwarded by the network operator of real network 312 to the application provider server 308. The application provider knows about the device and will accept it in the network. Communication continues with these new session parameters.

No changes are required for the network operator, which does not need to know about the factory setting of a device. The network operator may simply be informed that there is a new device associated with the application provider. Further, full protection against an eavesdropper using a radio sniffer may be provided. The exchanges and re-personalization inside the RF-shielded box can be left otherwise unprotected. The secret key may even be a well-known common value. Security is provided by the RF-shield and the encrypted channel between the gateway and the application provider server. In the case of a common secret key, the process may be fully automated as the secret key need only be provided once. The application provider server may automatically accept all requests from devices which are subsequently placed in the RF-shielded box, since they too use the common secret key.

Figure 5:
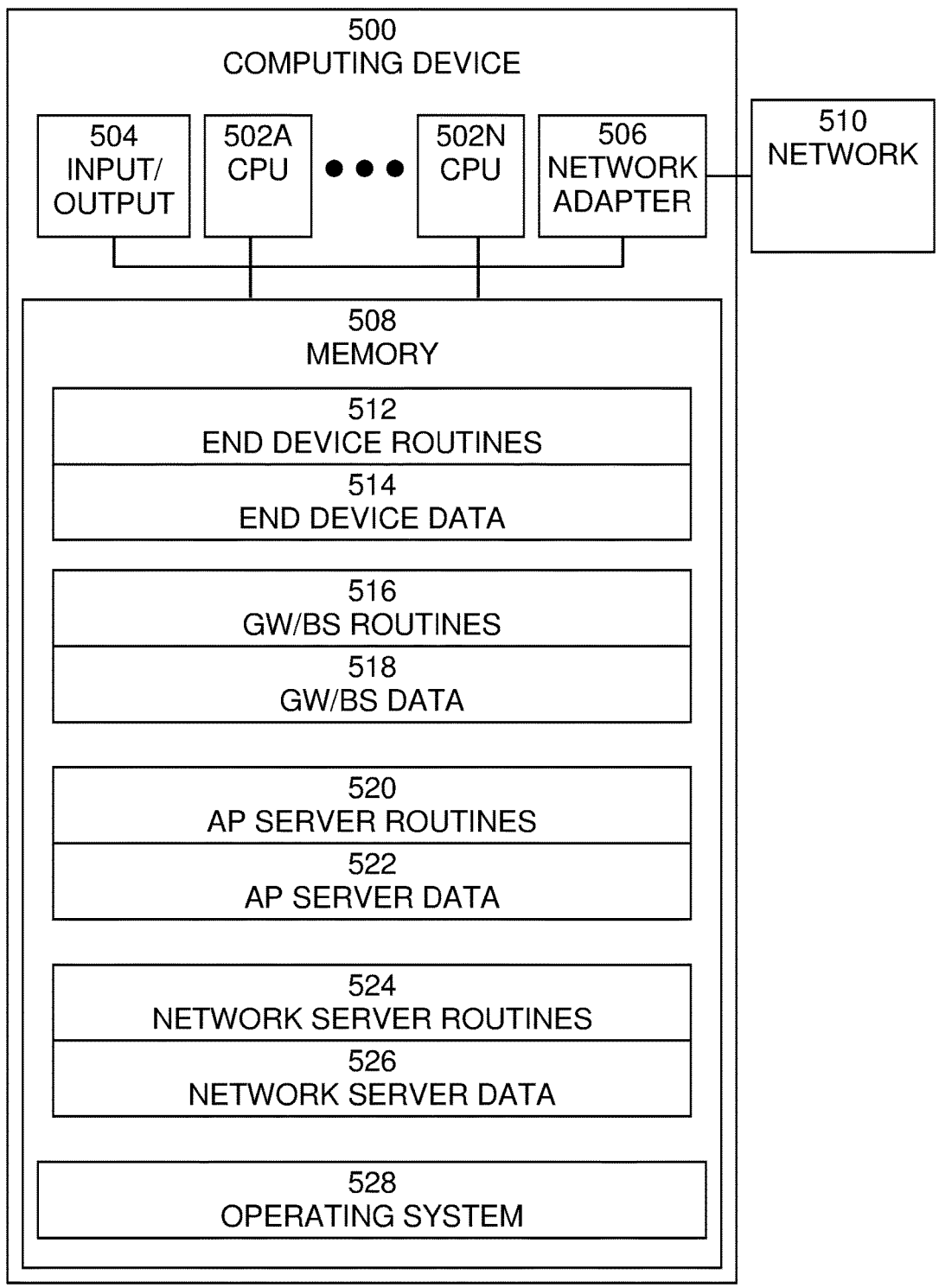
FIG. 5 is an exemplary block diagram of a computer system in which processes involved in the embodiments described herein may be implemented.

An exemplary block diagram of a computer system 500, in which processes involved in the embodiments described herein may be implemented, is shown in FIG. 5. Computer system 500 is typically a programmed general-purpose computer system, such as an embedded processor, system on a chip, personal computer, workstation, server system, and minicomputer or mainframe computer. Computer system 500 may include one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. For example, as shown in FIG. 1, computer systems may perform a variety of roles in the system, method, and computer program product described herein. For example, computer systems may perform one or more roles as end devices, gateways/base stations, application provider servers, and network servers. In the example shown in FIG. 5, exemplary memory contents are shown representing routines and data for all of these roles. However, one of skill in the art would recognize that these routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 5, memory 508 may include end device routines 512 and end device data 514, gateway/base station routines 516 and gateway/base station data 518, application provider server routines 520 and application provider server data 522, network server routines 524 and network server data 526, and operating system 528. For example, in an end device, end device routines 512 and end device data 514 may include routines and data to perform the functions of the end device and to communicate with other systems and devices. In a gateway/base station, gateway/base station routines 516 and gateway/base station data 518 may include routines and data to perform the functions of the gateway/base station and to communicate with other systems and devices. In an application provider server, application provider server routines 520 and application provider server data 522 may include routines and data to perform the functions of the end device and to communicate with other systems and devices. In a network server, network server routines 524 and network server data 526 may include routines and data to perform the functions of the network server and to communicate with other systems and devices. Operating system 532 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system.

Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. An end-device for communicating over a federated large scale wireless internet-of-things network, wherein said internet-of-things comprises:
    end-devices that include communication endpoint circuitry that is connected or attached to any other non-end-device or object that is controlled or monitored, or both;
    gateway concentrators having network nodes that are adapted to interface with said end-devices and with other network nodes, and includes data concentrator functionality adapted to wirelessly connect a number of data channels with one or a limited number of destinations;
    network servers that include a first computer device that receives and responds to communications providing functionality for other computer devices; and
    app servers that include a second computer device that receives and responds to communications and access or run applications providing functionality for other types of devices;
    said first and said second computer devices in said network servers and said app servers respectively comprise a processor, a memory accessible by said processor and computer program stored in said memory executable by said processor to perform receiving a message, wherein circuitry within said memory is configured to store a first set of network credentials in said end-device providing secure communications with a service provider and generating and transmitting a response to receiving information, and receiving confirmation that said end-device has been activated on a wireless network, establishing secure communication over said wireless network with said any other non-end-device, and generating and transmitting to said end-device a second set of network credentials;
    said first set of network credentials comprising a first identifier of said end-device which is a globally unique and valid end-device identification (ID) (DEVID), a first encryption key which is a random end-device key (DEVKEY), and an identifier of a first service provider which is a random service provider ID (rSPID),
    said first set of network credentials having been stored in said end-device when said end-device is manufactured; and
    said end-device uses circuitry within said memory to store a received second set of network credentials from said service provider over a wireless network;
    wherein said circuitry is configured to associate said end-device with said federated large-scale wireless internet-of-things network using said second set of network credentials;
    and
    said second set of network credentials comprising a second encryption key and an identifier of a service from which said second set of network credentials is received, said second set of network credentials providing personalized access to said wireless network;
    said end-device adapted to be personalized over-the-air (OTA) without involvement of said end-device manufacturers in said federated large-scale wireless network comprising Lona Range Wide Area Network (LoRaWAN); and
    (a) said end-device in operation is placed in a Radio Frequency (RF)-shielded box containing a gateway or base station (GW/BS), said GW/BS (a) having a secure connection to an application provider service, and further,
    (b) said GW/BS inside of said RF shielded box is adapter to run a reduced version of a network operator operating system, thus providing a simulated network, which is a simulation of a real network, such that said simulated network is a replica of said real network.

2. A computer program product for over-the-air personalization of an end-device, said computer program product comprising a non-transitory computer readable storage having program instructions embodied therewith, the program instructions executable by a computer, to cause the computer to perform a method comprising:
    in an internet-of-things network that comprises:
    end-devices that include communication end-point circuitry that is connected or attached to any other non-end-device or object that is controlled or monitored, or both;
    gateway concentrators having nodes that are adapted to interface with said end-devices and with other network nodes, and includes data concentrator functionality adapted to wirelessly connect a number of data channels with one or with a limited number of destinations;
    network servers that include a first computer device that receives and responds to communications providing functionality for other computer devices; and
    app servers that include a second computer device that receives and responds to communications and access or run applications providing functionality for other types of said non-end-devices;
    in said end-device, a manufacturer of same has stored an initial set of network credentials to personalize and configure with necessary identification and security information;
    said first set of network credentials comprises a first identifier of the said end-device which is a globally unique and valid end-device identification (ID) (DEVID), a first encryption key which is a random end-device key (DEVKEY), and an identifier of a first service provider which is a random service provider ID (rSPID),
    initiating service for said end-device by logging onto a federated wireless internet-of-things network; said federated wireless internet-of-things network comprising a processor, a memory accessible by said processor and a computer program stored in said memory, executable by said processor;

receiving a message, wherein circuitry within said memory is configured to store a first set of network credentials in said end-device providing secure communications with a service provider;

generating and transmitting a response to receiving information;

receiving confirmation that said end-device has been activated on a wireless network;

establishing a secure communication over said wireless network with said end-device, generating and transmitting to said end-device, a second set of network credentials; and implementing circuitry within said memory in said end-device to store a received second set of network credentials from said service provider over said wireless network; and receiving a second set of network credentials comprising a second encryption key which is a new DEVKEY and an identifier of a service which is said service provider's ID, from which said second set of network credentials is received, said computer program product further comprising associating said end-device with said federated large-scale wireless internet-of-things network using said second set of network credentials;

providing personalized access to said wireless network from said second set of network credentials;

personalizing said end-device over-the-air (OTA) without involvement of said end-device manufacturers in said federated large-scale wireless network comprising Long Range Wide Area Network (LoRaWAN);

placing said end-device in operation in a Radio Frequency (RF)-shielded box containing a gateway or base station (GW/BS), said GW/BS (a) having a secure connection to an application provider service, and (b) running a reduced version of a network operator operating system of said GW/BS inside of said RF shielded box, thus providing a simulated network, which is a simulation of a real network, such that said simulated network is a replica of said real network.

3. A computer-implemented method for over-the-air personalization of an end-device comprising:

in an internet-of-things network that comprises:

an end-device that includes communication endpoint circuitry that is connected or attached to any other non-end-device or object that is controlled or monitored, or both;

gateway concentrators having nodes that are adapted to interface with said end-devices and with other network nodes, and includes data concentrator functionality adapted to wirelessly connect a number of data channels with one or a limited number of destinations;

network servers that include a first computer device that receives and responds to communications providing functionality for other computer devices; and app servers that include a second computer device that receives and responds to communications and accesses or runs applications providing functionality for other types of computer devices;

associating said end-device with a federated wireless internet-of-things network, said federated wireless internet-of-things network comprising a processor, a memory accessible by said processor and computer program stored in said memory, executable by said processor;

in said end-device, a manufacturer of same has stored an initial set of network credentials to personalize and configure with necessary identification and security information;

said first set of network credentials comprises a first identifier of the said end-device which is a globally unique and valid end-device identification (ID) (DEVID), a first encryption key which is a random end-device key (DEVKEY), and an identifier of a first service provider which is a random service provider ID (rSPID), initiating service for said end-device by logging onto said federated wireless internet-of-things network;

receiving a message, wherein circuitry within said memory is configured to store a first set of network credentials in said end-device providing secure communications with a service provider;

generating and transmitting a response to receiving information;

receiving confirmation that said end-device has been activated on a wireless network;

establishing a secure communication over said wireless network with said end-device, generating and transmitting to said end-device a second set of network credentials;

and implementing circuitry within said memory in said end-device to store a received second set of network credentials from said service provider over said wireless network;

and receiving a second set of network credentials comprising a second encryption key which is a new DEVKEY and an identifier of a service which is the service provider's ID from which said second set of network credentials is received, wherein said second set of network credentials is used by said end-device to associate with said federated large-scale wireless internet-of-things network, providing personalized access to said wireless network from said second set of network credentials;

personalizing said end-device over-the-air (OTA) without involvement of said end-device manufacturers in said federated large-scale wireless network comprising Long Range Wide Area Network (LoRaWAN);

(a) placing said end-device in operation in a Radio Frequency (RF)-shielded box containing a gateway or base station (GW/BS), said GW/BS (a) having a secure connection to an application provider service, and further, (b) running a reduced version of a network operator operating system of said GW/BS inside of said RF shielded box, thus providing a simulated network, which is a simulation of a real network, such that said simulated network is a replica of said real network.

4. The method of claim 3, further comprising, in response to an initiation of service for said end-device, determining an eligibility of said end-device for service.

5. A system for over-the-air personalization of an end-device, the system comprising:

end-devices that communicate over a federated large-scale wireless internet-of-things network wherein said federated large-scale wireless internet-of-things network includes communication endpoint circuitry that is connected or attached to any other non-end-device or object that is controlled or monitored, or both;

gateway concentrators having nodes that are adapted to interface with said end-devices and with other network nodes, and includes data concentrator functionality adapted to wirelessly connect a number of data channels with one or with a limited number of destinations;

network servers that include a first computer device that receives and responds to communications providing functionality for other computer devices; and app servers that include a second computer device that receives and responds to communications and accesses or runs applications providing functionality for other computer devices;

said system further comprises a processor, a memory accessible by said processor and computer program stored in said memory executable by said processor to perform receiving a message, wherein circuitry within said memory is configured to store a first set of network credentials in said end-device providing secure communications with a service provider and generating, and transmitting a response to receiving information, and receiving confirmation that said end-device has been activated on a wireless network, establishing secure communication over said wireless network with said end-device, and generating and transmitting to said end-device a second set of network credentials;

said first set of network credentials comprising a first identifier of the said end-device which is a globally unique and valid end-device identification (ID) (DEVID), a first encryption key which is a random end-device key (DEVKEY) and an identifier of a first service provider which is a random service provider ID (rSPID), said first set of network credentials having been stored in said device when said end-device is manufactured;

and said end-device uses circuitry within said memory to store a received second set of network credentials from said service provider over said federated large-scale wireless internet-of-things network;

and said second set of network credentials comprising a second encryption key which is a new DEVKEY and a service providers ID which is an identifier of a service from which said second set of network credentials is received, wherein said second set of network credentials provide personalized access to said federated large-scale wireless internet-of-things network;

and wherein said second set of network credentials is used by said end-device to associate with said federated large-scale wireless internet-of-things network;

said end-device adapted to be personalized over-the-air (OTA) without involvement of said end-device manufacturers in a federated large scale wireless network comprising Long Range Wide Area Network (LoRaWAN);

(a) said end-device in operation is placed in a Radio Frequency (RF)-shielded box containing a gateway or base station (GW/BS), said GW/BS (a) having a secure connection to an application provider service, and further, (b) said GW/BS inside of said RF shielded box is adapted to run a reduced version of a network operator operating system, thus providing a simulated network, which is a simulation of a real network, such that said simulated network is a replica of said real network.

6. The system of claim 5, further comprising, in response to an initiation of service for said end-device, determining an eligibility of said end-device for service.

* * * * *